Feb. 13, 1934. J. A. GERMONPREZ 1,946,788
DAMPER CONTROL FOR WALL REGISTERS OR GRILLES
Filed July 25, 1932
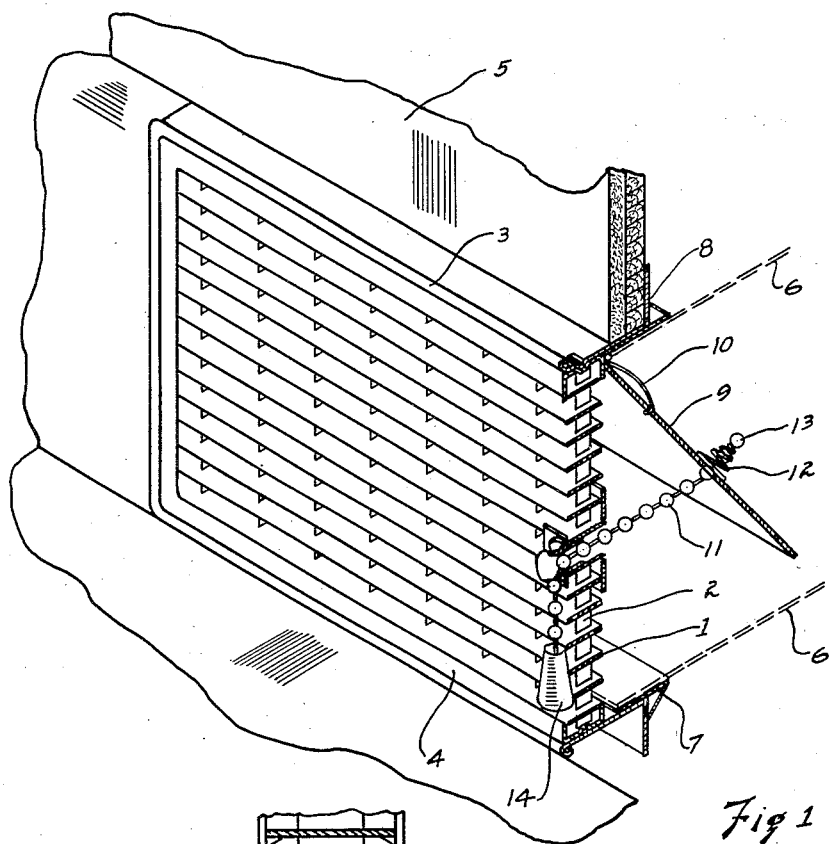
Fig 1
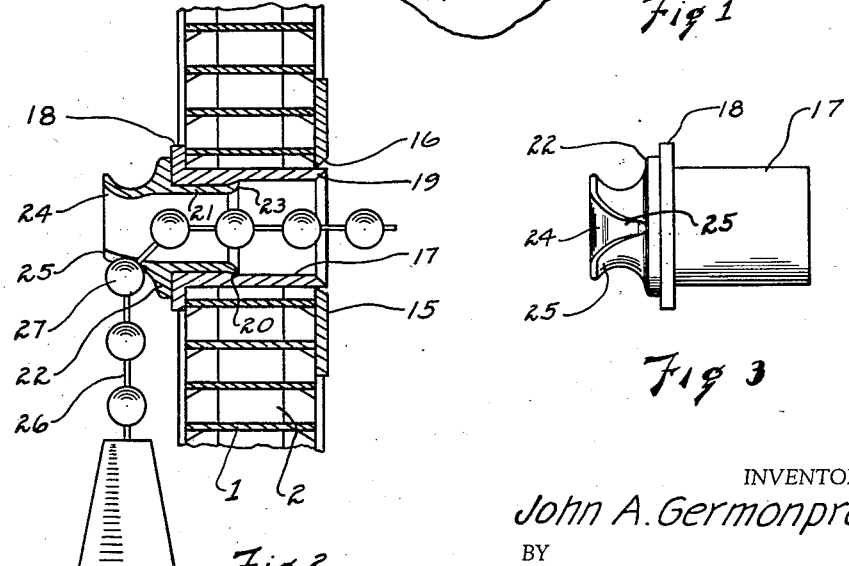
Fig 2
Fig 3
INVENTOR.
John A. Germonprez
BY
ATTORNEY.

Patented Feb. 13, 1934

1,946,788

UNITED STATES PATENT OFFICE 1,946,788

DAMPER CONTROL FOR WALL REGISTERS OR GRILLES

John A. Germonprez, Detroit, Mich., assignor to Uni-Flo Grille Corporation, Detroit, Mich., a corporation of Michigan Application July 25, 1932. Serial No. 624,381

6 Claims. (Cl. 98—106)

This invention relates to damper control for wall registers or grilles, and the object of the invention is to provide in a grille structure, including a damper on the rear face thereof spring-actuated to open position, a means in conjunction therewith for regulating the position of the damper, the said means including a rotatable element through which a flexible operating element extends that is rotatable, the purpose being to enable an operator to simply grasp an extending portion of the flexible operating element on the front face of the grille from any direction, under which condition the rotatable element associated therewith will turn to allow the flexible element to draw through the said rotatable element in the direction of the pull.

A further object and feature of the invention resides in the provision of an insert in the body of the grille preferably approximately centrally disposed thereof that has a slot and the pull member is preferably of the ball-link type, said balls being spaced by metal elements or links therebetween, the said metal elements being readily movable in the slot while the ball cannot pass through the slot. Thus, with a damper that is spring-actuated to open position, by pulling on the flexible ball link operating element, any one of the series of balls may be used as a stop element and thus limit the extent of opening of the damper. Frequently such grilles are placed adjacent the floor line for instance providing an outlet to a hot air furnace or a duct through which air is passed. Thus the operator would normally have to exert a pull on the said flexible element downwardly to position a link in the slot.

A feature of my invention is in the provision of a tubular member having a bell like mouth and a slot in one side thereof, said tubular member being rotatably supported in the grille whereby an operator in stooping to release the ball-link flexible member merely grasps the same and exerts the pull thereon. Under this condition the member rotates to bring a slot in the direction of the line of pull which is therefore in position to be observed by the operator in positioning the spacing link in place in the slot as may be desired. The preferred form of construction of a grille embodying my invention is shown in the accompanying drawing in which—

Fig. 1 is a sectional perspective view showing my improved pull member and supporting element therefor.

Fig. 2 is an enlarged vertical section thereof.

Fig. 3 is an elevation showing the preferred form of the notch.

It firstly is to be understood that the grille element through which air or gases may pass may be of any desired construction, the form shown merely being typical of a grille structure consisting of a series of parallel bars or plates 1 secured on spacing rods 2 which in turn are secured at opposite ends to the side members 3 and 4 of the grille frame. This grille is here shown as being positioned at the base of a wall 5 and a duct is indicated at 6 in dotted lines leading to an upper and lower frame structure 7 and 8 of the grille.

At the rear of the grille frame and hingedly supported to the top side frame 3 is a damper 9 provided with a spring or preferably several springs as indicated at 10 so positioned and of a form tending to swing the damper 9 to full open position. With this arrangement of parts I provide an operating means which consists preferably of a ball-link type flexible pull member 11. The damper member has an aperture through which the pull member may pass and I preferably provide a spiral shaped coiled spring 12 through which the pull member extends, the terminal ball 13 of which seats on the small end of the spring 12, the said end being so tightly wound as to prevent the ball being pulled therethrough. This provides a flexible connection of the pull with the damper.

The pull member extends through a tubular element provided in the grille and is provided with a terminal portion 14 to be grasped by the operator. The tubular element is preferably of the form shown although such form may be changed in structural characteristics except that rotatable means is provided to enable the pull member to be drawn from any direction and set it in its adjusted position.

The supporting element and lock or catch for the flexible pull member is preferably formed of an apertured plate 15 on the rear of the grille, the edge of the plate defining the aperture being tapered as indicated at 16 and from the face of the grille is introduced a tubular element 17 flanged at 18 to engage over the face of the grille and the body projecting preferably to practically flush with the outer surface of the plate 15. The edge 19 thereof (not here shown) may then be turned or spun over the tapered wall 16 of the aperture in the plate 15, as will be readily understood, and by such arrangement the tubular element 17 and the plate 16 may be secured in fixed relation. It is to be noted that the tubular member 17 has a greater thickness of wall toward the front of the grille providing a shoulder 20 intermediate its ends. Into this front or thicker walled portion of the member 17 is introduced the rotatable latch element 21 which is flanged at 22 to engage the face of the flange 18 of the element 17 and the rear edge of the member 21 is outturned at 23 to engage back of the shoulder 20. This spinning over of the said end 23 of the element 21 is completed after the parts are assembled and the spinning over step in the assembly of the parts should leave the element 21 free to rotate in the member 17. Although the drawing does not so show, there is sufficient space between the outer walls of the member 21 and the inner wall of the thicker end portion of the member 17 as to permit such freedom of rotation and the member 23 is spun over sufficiently to prevent removal of the member 21 from the element 17.

The rotatable element 21 has a bell mouth 24 at the face of the grille and one wall thereof has a slot 25, preferably of V form as shown in Fig. 3 through which the link or bar 26 between the balls of the flexible element may freely pass and through which it is not possible to pass a ball 27.

The operation of the device is extremely simple in that all that is necessary for the operator to consider is the pulling of the flexible member. For this purpose, the element 14 is provided and is simply grasped and pulled from any direction. Under this condition the member 21 rotates bringing the slot toward the operator or in the direction of the pull and therefore visible to enable the operator to set the flexible element at the desired point of adjustment in regulating the extent of opening of the damper. This feature of construction of the element in the grille member through which the flexible element extends and by which it is held in adjusted position forms the principal subject matter of this invention.

From the foregoing description it is believed evident that the various objects of the invention as hereinbefore set forth are attained, and that the device is extremely simple and inexpensive in construction.

Having thus fully described my invention, its utility and mode of operation, what I claim and desire to secure by Letters Patent of the United States is:—

1. In a grille having a damper associated therewith yieldably urged to open position, a pull member therefor flexible in character and having spaced portions thereof of greater size than intervening portions, a supporting element for said member provided in the grille including a rotatable tubular element, said element having a slot in its wall at the open end thereof through which the pull member extends of a width to receive a portion thereof of smaller size and to prevent movement therethrough of a portion of the larger size providing a means for adjusting the extent of opening of the damper.

2. In a grille having a damper associated therewith yieldably urged to open position, a pull member therefor flexible in character and having spaced portions of greater size than intervening portions, a supporting element for said member mounted in the grille including a rotatable tubular element providing an opening through the grille, the said element having a slot in its wall at the open end through which the pull member extends of a width to receive a portion of the pull member of smaller size and prevent movement therethrough of a portion of larger size, a stationary tubular element supporting said rotatable tubular element formed with a shoulder over which an end of the tubular element is turned to prevent withdrawal, a flange on the said rotatable element engaging the face of the stationary element, and means for securing the said stationary element in position.

3. In a grille having a damper associated therewith yieldably urged to open position, a pull member for regulating the position of the same having large and small sized portions flexibly connected together, a tubular element positioned in the grille through which the said flexible pull member extends, said tubular element being rotatable in the grille and having a slot in its open end of a size to receive the smaller elements of the pull member and prevent passage of the larger elements therethrough, the arrangement providing that through a pull on the pull member, said rotatable element turns to bring the slot thereof facing the direction of the strain on the flexible member substantially as described.

4. A grille having a damper associated therewith yieldably urged to open position, a pull member therefor of the ball-link type providing a flexible pull member connected at one end to the damper, the opposite end extending through the grille, said grille having a stationary tubular member through which the pull member extends and a second tubular member rotatably supported in the said first member, said second member having a bell-shaped mouth, and a slot formed in the edge thereof of a size to receive a link of the pull member and to prevent movement of a ball therethrough.

5. A grille having a damper associated therewith yieldably urged to open position, a pull member therefor of the ball-link type providing a flexible pull member connected at one end to the damper, the opposite end extending through the grille, said grille having a stationary tubular member through which the pull member extends and a second tubular member rotatably supported in the said first member, an apertured plate on the damper side of the grille, said second member having a bell-shaped mouth, and a slot formed in the edge thereof of a size to receive a link of the pull member and to prevent movement of a ball therethrough, said first tubular member having a flange at one end and its opposite end extending through said apertured plate, the end of the tubular member being spun over the edge of the plate to secure the stationary member in fixed position in the grille.

6. In a grille construction, a frame, a grille mounted therein, said grille having an aperture, a rotatable element in the said aperture, a damper pivoted to the frame, a spring tending to move the damper to open position, a pull member for adjusting the extent of the opening consisting of a flexible element extending through the opening and adapted at various portions of its length to be secured to the said rotatable element, said securing means including a slot provided in the rotatable element in which portions of the pull member may be introduced to thereby hold the damper from movement by the spring.

JOHN A. GERMONPREZ.